(12) United States Patent
Fukahori

(10) Patent No.: US 10,978,249 B2
(45) Date of Patent: Apr. 13, 2021

(54) THIN-FILM DEVICE AND METHOD OF MANUFACTURING THIN-FILM DEVICE

(71) Applicant: Murata Manufacturing Co., Ltd., Nagaokakyo (JP)

(72) Inventor: Souko Fukahori, Nagaokakyo (JP)

(73) Assignee: MURATA MANUFACTURING CO, LTD., Nagaokakyo (JP)

( * ) Notice: Subject to any disclaimer, the term of this patent is extended or adjusted under 35 U.S.C. 154(b) by 154 days.

(21) Appl. No.: 16/356,235

(22) Filed: Mar. 18, 2019

(65) Prior Publication Data

US 2019/0214194 A1 Jul. 11, 2019

Related U.S. Application Data

(63) Continuation of application No. PCT/JP2018/000847, filed on Jan. 15, 2018.

(30) Foreign Application Priority Data

Feb. 17, 2017 (JP) .............................. JP2017-028011

(51) Int. Cl.
| | |
|---|---|
| *H01G 4/224* | (2006.01) |
| *H01G 4/232* | (2006.01) |
| *H01G 4/33* | (2006.01) |
| *H01G 4/12* | (2006.01) |

(52) U.S. Cl.
CPC ............. *H01G 4/224* (2013.01); *H01G 4/12* (2013.01); *H01G 4/2325* (2013.01); *H01G 4/33* (2013.01)

(58) Field of Classification Search
CPC ...................................................... H01G 4/33
See application file for complete search history.

(56) References Cited

U.S. PATENT DOCUMENTS

| 2008/0186654 A1* | 8/2008 | Takeshima | ............. H01G 4/232 |
| | | | 361/313 |
| 2013/0083439 A1 | 4/2013 | Hayakawa | |

(Continued)

FOREIGN PATENT DOCUMENTS

| JP | H0428409 A | 1/1992 |
| JP | 2000252131 A | 9/2000 |
| JP | 2001015599 A | 1/2001 |

(Continued)

OTHER PUBLICATIONS

International Search Report issued for PCT/JP2018/000847, dated Mar. 20, 2018.

(Continued)

*Primary Examiner* — Eric W Thomas
(74) *Attorney, Agent, or Firm* — Arent Fox LLP

(57) ABSTRACT

A thin-film device that includes a base portion and a rewiring layer. The rewiring layer includes a first resin insulating layer and a second resin insulating layer, which are sequentially arranged from a side of the base portion, metallic layers and close-contact layers. The metallic layers and the close-contact layers form a respective wiring electrodes. These wiring electrodes are disposed at an interface between the first resin insulating layer and the second resin insulating layer. At an end portion of the wiring electrodes, the close-contact layer projects from the metallic layer by a first predetermined length along the interface.

12 Claims, 7 Drawing Sheets

(56) References Cited

U.S. PATENT DOCUMENTS

2013/0328735 A1* 12/2013 Ishii .................. G06K 19/0726
343/748
2017/0345577 A1 11/2017 Nakaiso et al.

FOREIGN PATENT DOCUMENTS

| | | |
|---|---|---|
| JP | 2007081325 A | 3/2007 |
| JP | 2013172075 A | 9/2013 |
| JP | 2014090077 A | 5/2014 |
| JP | 5704291 B1 | 4/2015 |
| WO | 2011152256 A1 | 12/2011 |
| WO | 2012121138 A1 | 9/2012 |
| WO | 2016136564 A1 | 9/2016 |
| WO | 2016181710 A1 | 11/2016 |

OTHER PUBLICATIONS

Written Opinion of the International Searching Authority issued for PCT/JP2018/000847, dated Mar. 20, 2018.

\* cited by examiner

THIN-FILM DEVICE AND METHOD OF MANUFACTURING THIN-FILM DEVICE

CROSS REFERENCE TO RELATED APPLICATIONS

The present application is a continuation of International application No. PCT/JP2018/000847, filed Jan. 15, 2018, which claims priority to Japanese Patent Application No. 2017-028011, filed Feb. 17, 2017, the entire contents of each of which are incorporated herein by reference.

FIELD OF THE INVENTION

The present invention relates to a thin-film device that includes a rewiring layer.

BACKGROUND OF THE INVENTION

In the related art, various thin-film devices have been proposed. For example, thin-film devices that are described in Patent Documents 1 and 2 each include functional elements such as a resistor and a capacitor formed in a base portion.

A rewiring layer is formed such that functional element is between the rewiring layer and the base portion. A metal such as copper is used for a wiring electrode of the rewiring layer. In general, a protective resin insulating layer covers the wiring electrode excluding a portion of the wiring electrode that functions as an external connection terminal.

Patent Document 1: International Publication No. 2016/181710
Patent Document 2: International Publication No. 2016/136564

SUMMARY OF INVENTION

However, although each of the structures of the thin-film devices described in Patent Documents 1 and 2 includes a protective resin insulating layer, in a state where voltage is applied between a positive wiring electrode and a negative wiring electrode, electrochemical migration may sometimes be caused by moisture, and a dendrite containing a metal of the wiring electrodes may sometimes be formed.

When a dendrite is formed, the dielectric withstanding voltage between the positive wiring electrode and the negative wiring electrode decreases, resulting in functional deterioration of the thin-film device and a decrease in the reliability of the thin-film device.

Accordingly, it is an object of the present invention to provide a thin-film device that suppresses occurrence of electrochemical migration in a wiring electrode of a rewiring layer.

A thin-film device according to the present invention includes a base portion and a rewiring layer. The rewiring layer includes a first resin insulating layer and a second resin insulating layer that are sequentially arranged from a side of the base portion, and a wiring electrode. The wiring electrode is disposed at an interface between the first resin insulating layer and the second resin insulating layer. The wiring electrode includes at least a first wiring electrode. The first wiring electrode includes a close-contact layer that is disposed on a surface of the first resin insulating layer and a metallic layer that is disposed on a surface of the close-contact layer. At an end portion of the first wiring electrode, the close-contact layer projects from the metallic layer by a first predetermined length along the interface.

In this configuration, the entire rear surface of the metallic layer is in contact only with the close-contact layer, and the metallic layer is not in contact with the interface. As a result, a gap is not generated between the metallic layer and the interface, so that entry of moisture and condensation of steam into water due to capillary action in such a gap are suppressed, and occurrence of electrochemical migration is suppressed.

It is preferable that the thin-film device according to the present invention have the following configuration. A functional element that includes a positive electrode terminal and a negative electrode terminal is provided on a surface of the base portion or in the base portion. The wiring electrode includes the first wiring electrode that is connected to the positive electrode terminal and a second wiring electrode that is connected to the negative electrode terminal. At the end portion of the first wiring electrode facing the second wiring electrode, the close-contact layer of the first wiring electrode projects from the metallic layer of the first wiring electrode by the first predetermined length along the interface.

In this configuration, the entire rear surface of the metallic layer is in contact only with the close-contact layer, and the metallic layer is not in contact with the interface. As a result, on the positive electrode side where electrochemical migration occurs, entry of moisture between the metallic layer and the interface is suppressed.

In the thin-film device according to the present invention, it is preferable that a thickness of the metallic layer be larger than a thickness of the close-contact layer.

In this case, when the wiring electrode is covered with a protective resin insulating layer, the protective resin insulating layer is brought into close contact with an end portion of the metallic layer and becomes dense. As a result, the occurrence of electrochemical migration is further suppressed.

In the thin-film device according to the present invention, it is preferable that the metallic layer be made of copper or an alloy containing copper as a main component and that the close-contact layer be made of titanium or a material containing titanium as a main component.

With this configuration, occurrence of the above-mentioned electrochemical migration is suppressed while forming the metallic layer and the close-contact layer by using a readily available material out of which the wiring electrode of the rewiring layer is made.

The thin-film device according to the present invention may have the following configuration. The metallic layer has a first surface that is in close contact with the close-contact layer, which is disposed on the surface of the first resin insulating layer, and a second surface that is opposite to the first surface. The wiring electrode includes a close-contact layer that is in close contact with the second surface. The close-contact layer that is in close contact with the second surface is made of the same material as the close-contact layer that is disposed on the surface of the first resin insulating layer. At an end portion of the first wiring electrode, the close-contact layer that is in close contact with the second surface projects from the metallic layer by a second predetermined length along the interface.

With this configuration, the degree of contact between the protective resin insulating layer covering the first wiring electrode and the wiring electrode is improved.

In the thin-film device according to the present invention, it is preferable that the first predetermined length or the second predetermined length be not less than a thickness of the metallic layer.

With this configuration, when a manufacturing method using wet etching or the like is applied, a level difference is reliably generated between the metallic layer and the close-contact layer.

In addition, the present invention is directed to a method of manufacturing a thin-film device having a rewiring layer that includes a wiring electrode having a close-contact layer and a metallic layer. The method of manufacturing the thin-film device includes forming the close-contact layer onto a surface of a resin insulating layer that is a base of the rewiring layer, forming the metallic layer onto a surface of the close-contact layer, and forming a resist film onto a surface of the metallic layer. The method of manufacturing the thin-film device further includes performing a first etching on the metallic layer, performing etching on the close-contact layer, and performing a second etching on the metallic layer until the close-contact layer projects from an end portion of the first metallic layer by a predetermined length. These etching operations are preferably performed by using a single resist pattern film. The method of manufacturing the thin-film device further includes removing the resist film.

By using this manufacturing method, a thin-film device having the above-described configuration can be manufactured by a simple flow of processes.

According to the present invention, occurrence of electrochemical migration in a wiring electrode of a rewiring layer can be suppressed.

DETAILED DESCRIPTION OF THE PREFERRED EMBODIMENTS

Figure 1:
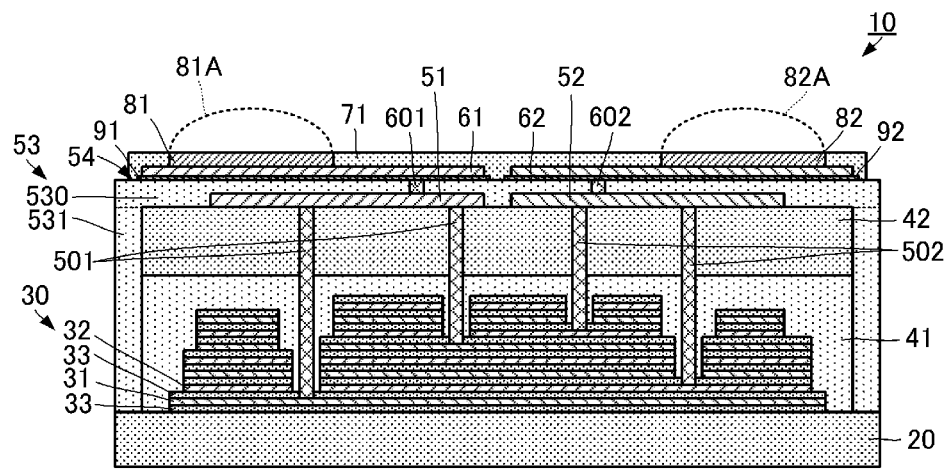
FIG. 1 is a sectional side view illustrating a structure of a thin-film device according to a first embodiment of the present invention.
Figure 2:
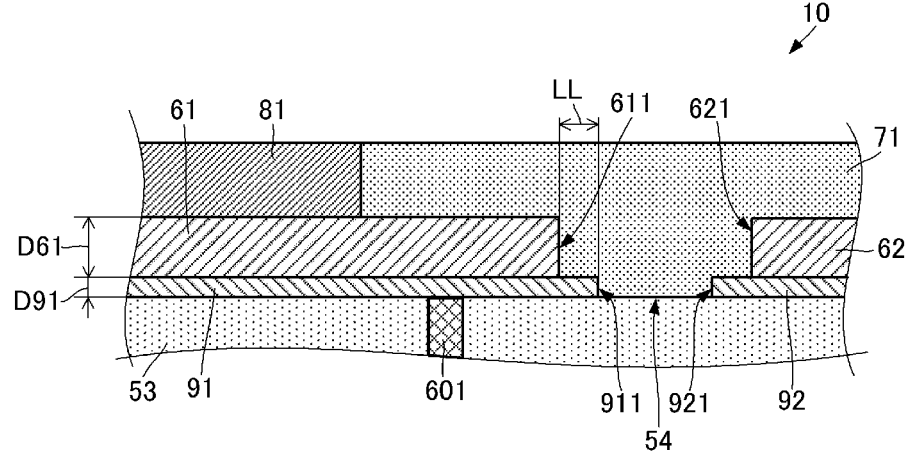
FIG. 2 is a partially enlarged sectional side view illustrating a configuration of a rewiring layer of the thin-film device according to the first embodiment of the present invention.
Figure 3:
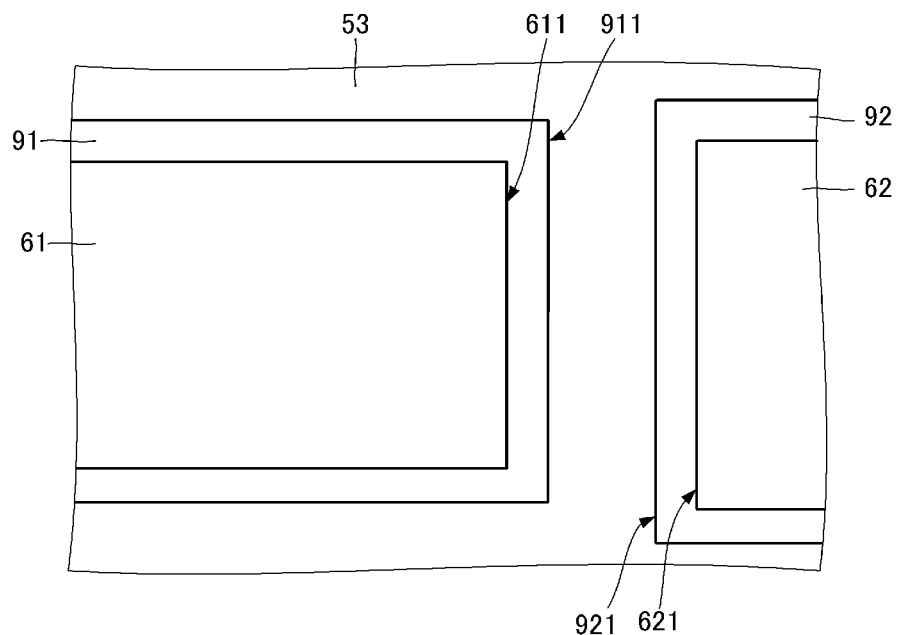
FIG. 3 is an enlarged plan view illustrating the configuration of the rewiring layer of the thin-film device according to the first embodiment of the present invention.

A thin-film device according to a first embodiment of the present invention will now be described with reference to the drawings. FIG. 1 is a sectional side view illustrating a structure of a thin-film device according to the first embodiment of the present invention. FIG. 2 is a partially enlarged sectional side view illustrating a configuration of a rewiring layer of the thin-film device according to the first embodiment of the present invention. FIG. 3 is an enlarged plan view illustrating the configuration of the rewiring layer of the thin-film device according to the first embodiment of the present invention.

As illustrated in FIG. 1, a thin-film device 10 includes a base substrate 20, a capacitor layer 30, insulator layers 41 and 42, base input/output electrodes 51 and 52, metallic layers 61 and 62, a resin insulating layer 53, a resin insulating layer 71, terminal electrodes 81 and 82, and close-contact layers 91 and 92.

The thin-film device 10 shown in FIGS. 1-3 is a thin-film capacitor device and is obtained by forming the capacitor layer and the above-mentioned components on the base substrate 20 through a thin-film process. The capacitor layer corresponds to a "functional element" according to the present disclosure.

The base substrate 20 is a semiconductor substrate or an insulating substrate. The base substrate 20 has a rectangular shape when viewed in plan view. The capacitor layer 30 is formed on a front surface of the base substrate 20. The capacitor layer 30 includes a plurality of first capacitor electrodes 31, a plurality of second capacitor electrodes 32, and a plurality of dielectric layers 33. More specifically, the capacitor layer 30 has the following configuration. One of the dielectric layers 33 that functions as a close-contact layer for a capacitor is formed on the front surface of the base substrate 20. One of the first capacitor electrodes 31, another one of the dielectric layers 33, and one of the second capacitor electrodes 32 are sequentially formed on the surface of the close-contact layer for a capacitor. The first capacitor electrode 31 and the second capacitor electrode 32 face each other with the dielectric layer 33 interposed therebetween. Another one of the dielectric layers 33 is formed on the surface of the second capacitor electrode 32. By repeatedly forming this layer structure, the plurality of first capacitor electrodes 31 and the plurality of second capacitor electrodes 32 are arranged in a lamination direction such that each of the first capacitor electrodes 31 and a corresponding one of the second capacitor electrodes 32 face each other with one of the dielectric layers 33 interposed therebetween.

The plurality of first capacitor electrodes 31 are positive electrodes, and the plurality of second capacitor electrodes 32 are negative electrodes.

The insulator layer 41 has a shape covering substantially the entire front surface of the base substrate 20. In this case, the insulator layer 41 covers the front surface and the side surfaces of the capacitor layer 30. The insulator layer 41 functions as a moisture-resistant protective film. As a result, all the surfaces of the capacitor layer 30 are covered with the insulator layer 41 and the base substrate 20, and the capacitor layer 30 is protected against an external environment such as humidity. The insulator layer 42 is formed on a surface of the insulator layer 41 opposite to the surface of the insulator layer 41 that is in contact with the base substrate 20.

A plurality of contact holes 501 and 502 are formed in the insulator layer 41 and the insulator layer 42 so as to extend in a thickness direction. A first end of each of the plurality of contact holes 501 is connected to one of the plurality of first capacitor electrodes 31, and a second end of each of the plurality of contact holes 501 is exposed at a surface of the insulator layer 42. A first end of each of the plurality of contact holes 502 is connected to one of the plurality of second capacitor electrodes 32, and a second end of each of the plurality of contact holes 502 is exposed at the surface of the insulator layer 42.

The base input/output electrodes 51 and 52 each have a flat film-like shape and are formed on the surface of the insulator layer 42. Although not illustrated, a plurality of base input/output electrodes 51 and a plurality of base input/output electrodes 52 are provided. The base input/output electrodes 51 are connected to the first capacitor electrodes 31 via the plurality of contact holes 501. Each of the base input/output electrodes 51 corresponds to a positive electrode terminal of the thin-film device 10. The base input/output electrodes 52 are connected to the second capacitor electrodes 32 via the plurality of contact holes 502. Each of the base input/output electrodes 52 corresponds to a negative electrode terminal of the thin-film device 10.

A "base portion" according to the present disclosure is formed of the base substrate 20, the capacitor layer 30, the insulator layers 41 and 42, the base input/output electrodes 51 and 52, and the plurality of contact holes 501 and 502. Note that the functional element is not limited to a capacitor and may be any element as long as the element includes a positive electrode terminal and a negative electrode terminal. In addition, the functional element may at least be formed on a surface of the base portion or in the base portion.

The resin insulating layer 53 includes of a front-surface portion 530 and a side-surface portion 531. The resin insulating layer 53 is made of, for example, PBO. The front-surface portion 530 is formed on the surface of the insulator layer 42, and the side-surface portion 531 is formed on a side surface of the insulator layer 42 and a side surface of the insulator layer 41. In this case, the front-surface portion 530 of the resin insulating layer 53 covers the base input/output electrodes 51 and 52. The front-surface portion 530 of the resin insulating layer 53 corresponds to a "first resin insulating layer" according to the present disclosure.

The close-contact layers 91 and 92 are formed on a surface 54 of the resin insulating layer 53. The close-contact layer 91 and the close-contact layer 92 are formed so as to be spaced apart from each other. The close-contact layers 91 and 92 are each preferably made of titanium or a material containing titanium as a main component thereof. The close-contact layer 91 is connected to the base input/output electrodes 51 via a contact hole 601 that is formed in the resin insulating layer 53. The close-contact layer 92 is connected to the base input/output electrodes 52 via a contact hole 602 that is formed in the resin insulating layer 53.

The metallic layer 61 is formed on a surface of the close-contact layer 91. The metallic layer 62 is formed on a surface of the close-contact layer 92. The metallic layers 61 and 62 are each made of copper or an alloy containing copper as a main component. The metallic layer 61 and the close-contact layer 91 form a "first wiring electrode" according to the present disclosure, and the metallic layer 62 and the close-contact layer 92 form a "second wiring electrode" according to the present disclosure.

The terminal electrode 81 is formed on a surface of the metallic layer 61, and the terminal electrode 82 is formed on a surface of the metallic layer 62.

The resin insulating layer 71 is formed so as to cover the outer surfaces of the metallic layers 61 and 62 and the outer surfaces of the close-contact layers 91 and 92. Thus, the first wiring electrode, which includes the metallic layer 61 and the close-contact layer 91, and the second wiring electrode, which includes the metallic layer 62 and the close-contact layer 92, are formed at an interface between the front-surface portion 530 of the resin insulating layer 53 and the resin insulating layer 71. The resin insulating layer 71 is made of, for example, an epoxy-based resin material. In other words, the resin insulating layer 71 is made of a material different from that of the resin insulating layer 53.

With such a configuration, a rewiring layer is formed that includes, as its components, the front-surface portion 530 of the resin insulating layer 53, the first wiring electrode formed of the metallic layer 61 and the close-contact layer 91, the second wiring electrode formed of the metallic layer 62 and the close-contact layer 92, the resin insulating layer 71, and the contact holes 601 and 602. Therefore, the front-surface portion 530 of the resin insulating layer 53 corresponds to a "first resin insulating layer" according to the present disclosure, and the resin insulating layer 71 corresponds to a "second resin insulating layer" according to the present disclosure. It should be noted that although the figures show only a single first wiring electrode and a single second wiring electrode, the thin-film device may include a plurality of first and second wiring electrodes.

Note that the resin insulating layer 71 is formed such that the side surfaces of the terminal electrodes 81 and 82 are covered with the resin insulating layer 71 and that the front surfaces of the terminal electrodes 81 and 82 are exposed. A solder bump 81A is formed on the front surface of the terminal electrode 81, and a solder bump 82A is formed on the front surface of the terminal electrode 82.

In such a configuration, the rewiring layer of the thin-film device 10 has the following configuration.

As illustrated in FIG. 1, FIG. 2, and FIG. 3, when the thin-film device 10 is viewed in plan view, an end portion 911 of the close-contact layer 91 is located outside an end portion 611 of the metallic layer 61. In other words, the end portion 911 of the close-contact layer 91 projects further than the end portion 611 of the metallic layer 61 does along the interface (the surface 54 of the resin insulating layer 53) between the front-surface portion 530 of the resin insulating layer 53 and the resin insulating layer 71.

With this configuration, the entire rear surface of the metallic layer 61 is in contact only with the close-contact layer 91, and the metallic layer 61 is not in contact with the interface between the front-surface portion 530 of the resin insulating layer 53 and the resin insulating layer 71.

In a configuration of the related art, there is a case where an end portion of a close-contact layer is positioned further inside than an end portion of a metallic layer due to, for example, manufacturing specifications (wet etching conditions). In this case, the resin insulating layer 71 is less likely to enter between the metallic layer and the surface 54 of the front-surface portion 530 of the resin insulating layer 53. Consequently, moisture easily enters between the metallic layer and the surface 54 of the front-surface portion 530 of the resin insulating layer 53, so that electrochemical migration is likely to occur.

However, by employing the configuration of the thin-film device 10 according to the present embodiment, there will be no portion where moisture easily enters, and the occurrence of electrochemical migration can be suppressed.

Note that a distance LL between the end portion 911 of the close-contact layer 91, which projects along the interface, and the end portion 611 of the metallic layer 61, that is, the amount of projection of the close-contact layer 91 with respect to the metallic layer 61 may at least be larger than zero. In other words, the end portion 911 of the close-contact layer 91 may be located at a position where the end portion 911 of the close-contact layer 91 at least projects from the end portion 611 of the metallic layer 61. However, it is preferable to set the distance LL (the projection amount) to be equal to or greater than a thickness D61 of the metallic layer 61. By setting the distance LL as mentioned above, for example, even if there are variations in manufacturing processes, the close-contact layer 91 can be caused to project from the end portion 611 of the metallic layer 61 with certainty. The distance LL corresponds to a "first predetermined length" according to the present disclosure.

It is preferable that the thickness D61 of the metallic layer 61 be larger than a thickness D91 of the close-contact layer 91 (D61>D91). As a specific example, the thickness D61 of the metallic layer 61 is set to about 1,000 nm, and the thickness D91 of the close-contact layer 91 is set to about 100 nm. This setting increases the contact area between the resin insulating layer 71 and the end portion 611 of the metallic layer 61. Consequently, the interface strength between the resin insulating layer 71 and the end portion 611 of the metallic layer 61 is improved, and the resin insulating layer 71 at the end portion 611 becomes dense, so that occurrence of electrochemical migration can be suppressed with higher certainty.

In addition, even when the thickness D91 of the close-contact layer 91 is small, since the close-contact layer 91 projects from the end portion 611 of the metallic layer 61, the interface strength between the resin insulating layer 71 and the end portion 911 of the close-contact layer 91 is improved, and the resin insulating layer 71 at the end portion 911 becomes dense, so that occurrence or progress of electrochemical migration can be suppressed with higher certainty.

Note that, as a result of the thickness D61 of the metallic layer 61 being set to be larger than the thickness D91 of the close-contact layer 91, the resistance as a wiring electrode can be reduced, and the electrical characteristics as the thin-film device 10 are improved.

In addition, as illustrated in FIG. 1, FIG. 2, and FIG. 3, when the thin-film device 10 is viewed in plan view, an end portion 921 of the close-contact layer 92 is located outside an end portion 621 of the metallic layer 62. In other words, the end portion 921 of the close-contact layer 92 projects further than the end portion 621 of the metallic layer 62 does along the interface (the surface 54 of the resin insulating layer 53) between the front-surface portion 530 of the resin insulating layer 53 and the resin insulating layer 71. The projection amount of the close-contact layer 92 with respect to the metallic layer 62 is approximately the same as the projection amount of the close-contact layer 91 with respect to the metallic layer 61. Note that the end portion 921 of the close-contact layer 92 may be flush with the end portion 621 of the metallic layer 62 or may be positioned further inside than the end portion 621 of the metallic layer 62 is. However, by setting the projection amount of the close-contact layer 92 with respect to the metallic layer 62 to be approximately the same as the projection amount of the close-contact layer 91 with respect to the metallic layer 61, the projecting structure of the close-contact layer 92 with respect to the metallic layer 62 and the projecting structure of the close-contact layer 91 with respect to the metallic layer 61 can be formed through a single manufacturing process.

The thin-film device 10 having such a configuration is manufactured through the following steps.

Figure 4:
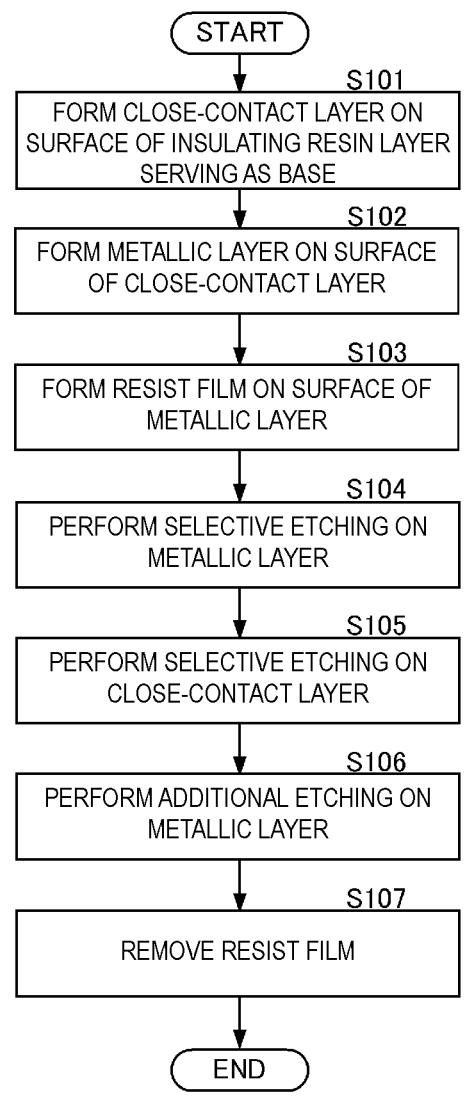
FIG. 4 is a flowchart illustrating a method of manufacturing wiring electrodes of the rewiring layer of the thin-film device according to the first embodiment of the present invention.

FIG. 4 is a flowchart illustrating a method of manufacturing the wiring electrodes of the rewiring layer of the thin-film device according to the first embodiment of the present invention. FIGS. 5(A) to 5(F) are partial sectional side views each of which schematically illustrates the shape of a portion of the rewiring layer in each step illustrated in FIG. 4. The steps in FIG. 4 will be sequentially described below with reference to FIGS. 5(A) to 5(F).

Figure 5A:
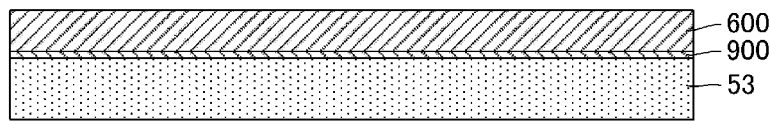
FIGS. 5(A) to 5(F) are partial sectional side views each of which schematically illustrates the shape of a portion of the rewiring layer in each step illustrated in FIG. 4.

As illustrated in FIG. 5(A), a close-contact layer 900 is formed on a surface of the resin insulating layer 53 that serves as a base of the rewiring layer (S101). The close-contact layer 900 is made of titanium or a material containing titanium as a main component and is formed so as to have a thickness of, for example, 100 nm. In addition, as illustrated in FIG. 5(A), a metallic layer 600 is formed on a surface of the close-contact layer 900 (S102). The metallic layer 600 is made of copper and is formed so as to have a thickness of, for example, 1,000 nm. Note that the close-contact layer does not need to be made of titanium or a material containing titanium as a main component and may be made of chrome or a material containing chrome as a main component.

Figure 5B:
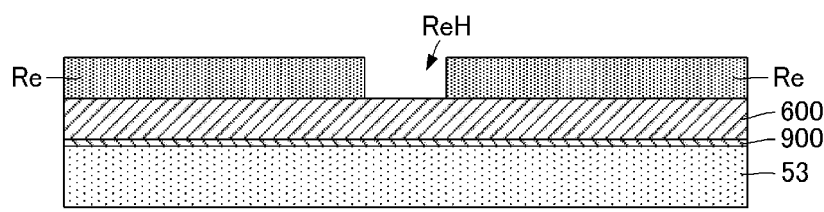

Next, as illustrated in FIG. 5(B), a resist film Re is formed on a surface of the metallic layer 600 (S103). In this case, the resist film Re has a resist non-formed portion ReH formed at a position where the metallic layers 61 and 62, which will be mentioned later, are separated from each other and where the close-contact layers 91 and 92 are separated from each other.

Figure 5C:
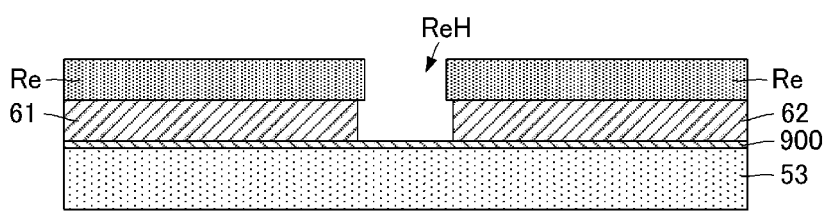

Next, selective etching is performed on the metallic layer 600 by using a first selective etching liquid that dissolves the metallic layer 600 and that does not dissolve the close-contact layer 900 (S104). As a result, as illustrated in FIG. 5(C), the metallic layer 61 and the metallic layer 62 that are separated from each other are formed.

Figure 5D:
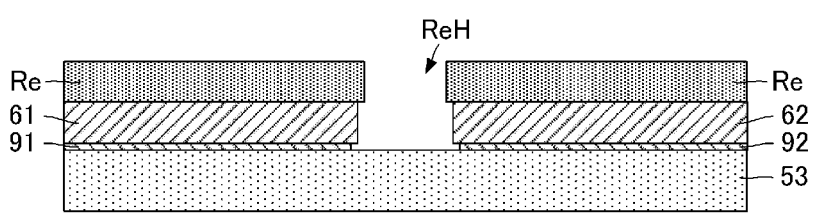

Next, selective etching is performed on the close-contact layer 900 by using a second selective etching liquid that dissolves the close-contact layer 900 and that does not dissolve the metallic layer 600 (S105). As a result, as illustrated in FIG. 5(D), the close-contact layer 91 and the close-contact layer 92 that are separated from each other are formed. Since a main object of this step is to reliably separate the close-contact layer 91 and the close-contact layer 92 from each other by using a single resist pattern, an end portion of the close-contact layer 91 is positioned further inside than an end portion of the metallic layer 61 is. In other words, in this state, the end portion of the metallic layer 61 projects further than the end portion of the close-contact layer 91 does along the interface (the surface of the resin insulating layer 53). Similarly, the end portion of the metallic layer 62 projects further than the end portion of the close-contact layer 92 does along the interface (the surface of the resin insulating layer 53).

Figure 5E:
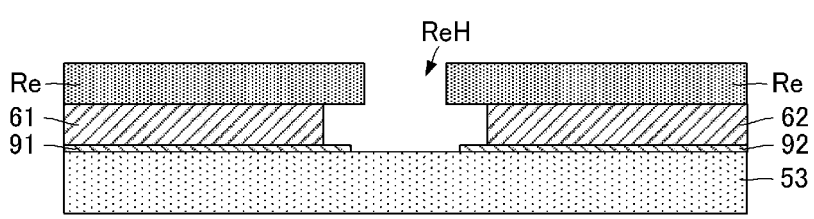

Next, additional etching is performed on the metallic layers 61 and 62 by using the first selective etching liquid that dissolves the metallic layers 61 and 62 and that does not dissolve the close-contact layers 91 and (S106). As a result, as illustrated in FIG. 5(E), the end portion of the close-contact layer 91 projects further than the end portion of the metallic layer 61 does along the interface (the surface of the resin insulating layer 53). Similarly, the end portion of the close-contact layer 92 projects further than the end portion of the metallic layer 62 does along the interface (the surface of the resin insulating layer 53). Each of these projection amounts can be controlled by the concentration of the etching liquid, etching time, and so forth, and each of the projection amounts is set to be equal to or greater than the thickness of each of the metallic layers 61 and 62. On the other hand, it is preferable that each of the projection amounts be three times or less the thickness of each of the metallic layers 61 and 62. The upper limit of each of the projection amounts is defined in this manner, so that a sufficient amount of an epoxy-based resin, out of which the resin insulating layer 71 will be made later, flows to the end portions of the metallic layers 61 and 62 and is reliably joined to the end portions (end surfaces) of the metallic layers 61 and 62. In addition, decrease in the density of the resin insulating layer 71 in the vicinity of these end portions can be suppressed.

Figure 5F:
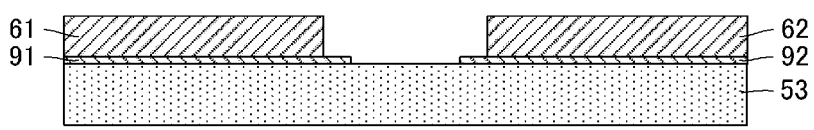

Next, as illustrated in FIG. 5(F), the resist film Re is removed (S107).

As described above, by employing the manufacturing method according to the present embodiment, a structure in which the end portion of the close-contact layer 91 projects further than the end portion of the metallic layer 61 does along the interface (the surface of the resin insulating layer 53) and in which the end portion of the close-contact layer 92 projects further than the end portion of the metallic layer 62 does along the interface (the surface of the resin insulating layer 53) can be realized without using different resist patterns for the metallic layers and for the close-contact layers.

A thin-film device according to a second embodiment of the present invention and a method of manufacturing the thin-film device will be described below with reference to the drawings.

Figure 6:
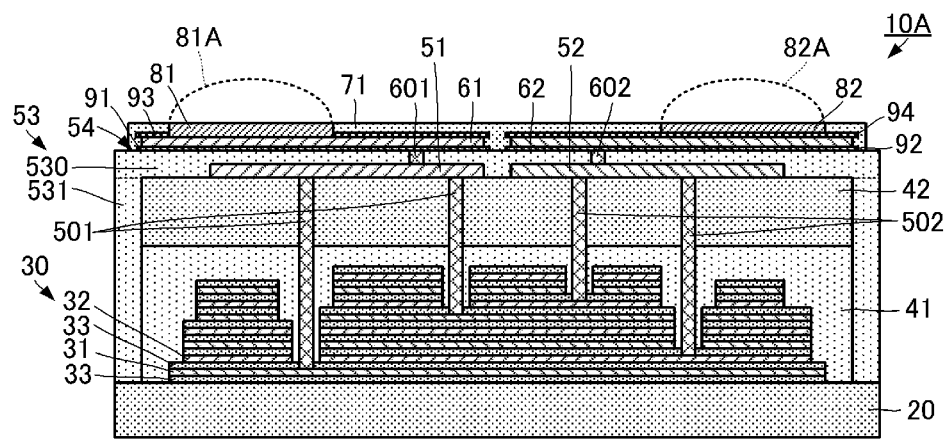
FIG. 6 is a sectional side view illustrating a structure of a thin-film device according to a second embodiment of the present invention.
Figure 7:
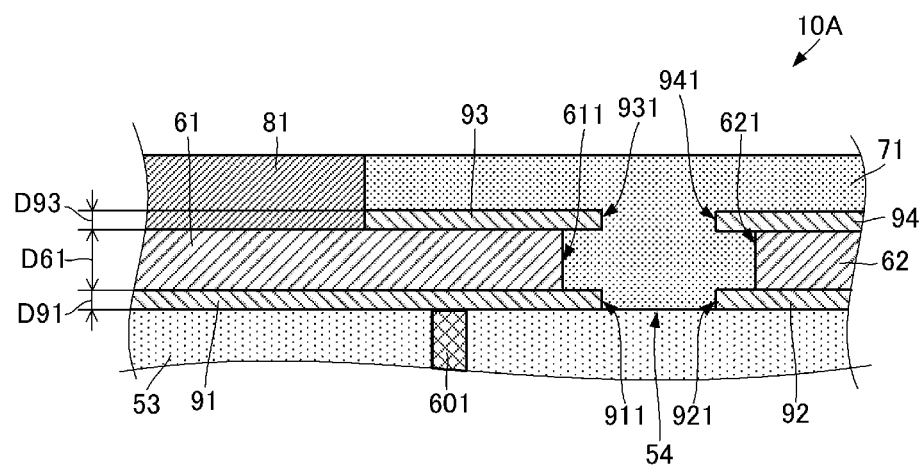
FIG. 7 is a partially enlarged sectional side view illustrating a configuration of a rewiring layer of the thin-film device according to the second embodiment of the present invention.

FIG. 6 is a sectional side view illustrating a structure of the thin-film device according to the second embodiment of the present invention. FIG. 7 is a partially enlarged sectional side view illustrating a configuration of a rewiring layer of the thin-film device according to the second embodiment of the present invention.

The difference between a thin-film device 10A according to the second embodiment and the thin-film device 10 according to the first embodiment is that the thin-film device 10A further includes close-contact layers 93 and 94 that are positioned on the side on which an external terminal is disposed. The rest of the configuration of the thin-film device 10A is similar to that of the thin-film device 10, and descriptions of similar portions will be omitted.

As illustrated in FIG. 6 and FIG. 7, the thin-film device 10A includes the close-contact layers 93 and 94. The close-contact layers 93 and 94 are made of the same material as the close-contact layers 91 and 92.

The close-contact layer 93 is formed on a surface (a "second surface" according to the present disclosure) of the metallic layer 61 that is opposite to a surface (a "first surface" according to the present disclosure) of the metallic layer 61 that is in contact with the close-contact layer 91. A thickness D93 of the close-contact layer 93 is approximately the same as the thickness D91 of the close-contact layer 91. Similar to the end portion 911 of the close-contact layer 91, an end portion 931 of the close-contact layer 93 projects further than the end portion 611 of the metallic layer 61 does along the interface. The amount of projection of the end portion 931 corresponds to a "second predetermined length" according to the present disclosure.

The close-contact layer 94 is formed on a surface of the metallic layer 62 that is opposite to a surface of the metallic layer 62 that is in contact with the close-contact layer 92. The thickness of the close-contact layer 94 is approximately the same as that of the close-contact layer 93. Similar to the end portion 921 of the close-contact layer 92, an end portion 941 of the close-contact layer 94 projects further than the end portion 621 of the metallic layer 62 does along the interface.

Also with such a configuration, advantageous effects similar to those of the first embodiment can be obtained. In addition, with this configuration, the degree of adhesion between the different materials, which are the material of the metallic layers 61 and 62 and the material of the resin insulating layer 71, at the surfaces of the metallic layers 61 and 62 is improved, and the reliability of the thin-film device 10A is further improved.

Note that, in this configuration, although the end portion 611 of the metallic layer 61 is located at a position where the end portion 611 is sandwiched between the close-contact layer 91 and the close-contact layer 93 while being more recessed than the close-contact layer 91 and the close-contact layer 93, the thickness D61 of the metallic layer 61 is sufficiently larger than the thickness of each of the close-contact layers 91 and 93, and the resin easily flows into the space between the close-contact layer 91 and the close-contact layer 93. Therefore, also with such a configuration, in which the metallic layer 61 is sandwiched between the close-contact layers 91 and 93, the end portion (end surface) of the metallic layer 61 and the resin insulating layer 71 can be joined to each other with certainty, and decrease in the density of the resin insulating layer 71 in the vicinity of this end portion can be suppressed. Note that, although description of the structure formed of the metallic layer 62 and the close-contact layers 92 and 94 will be omitted, this structure is similar to the structure formed of the metallic layer 61 and the close-contact layers 91 and 93, and similar advantageous effects are obtained.

The thin-film device 10A having such a configuration is manufactured through the following steps.

Figure 8:
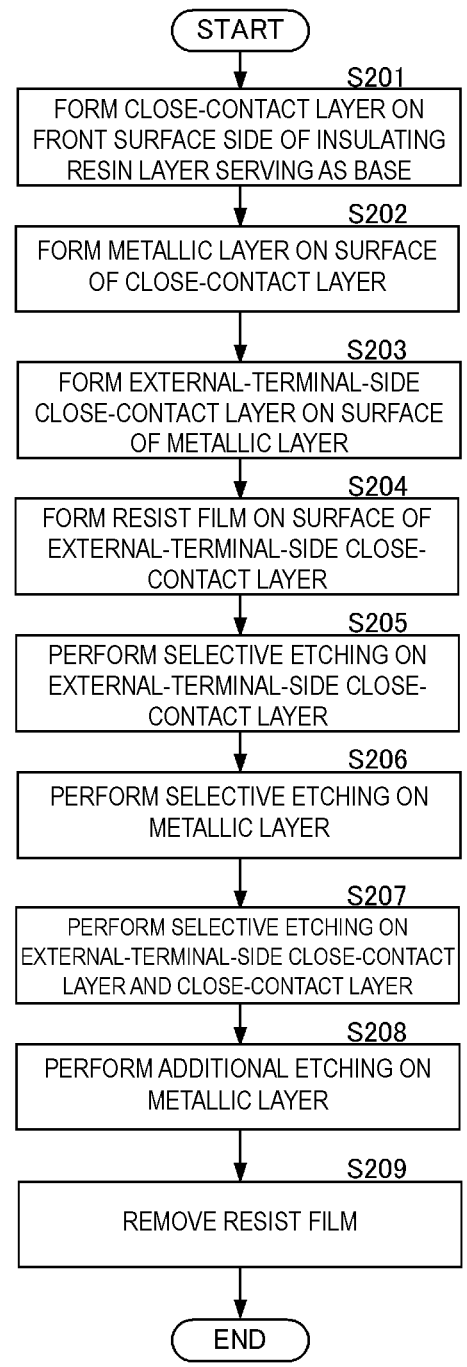
FIG. 8 is a flowchart illustrating a method of manufacturing wiring electrodes of the rewiring layer of the thin-film device according to the second embodiment of the present invention.

FIG. 8 is a flowchart illustrating a method of manufacturing wiring electrodes of the rewiring layer of the thin-film device according to the second embodiment of the present invention. FIGS. 9(A) to 9(G) are partial sectional side views each of which schematically illustrates the shape of a portion of the rewiring layer in each step illustrated in FIG. 8. The steps in FIG. 8 will be sequentially described below with reference to FIGS. 9(A) to 9(F).

Figure 9:
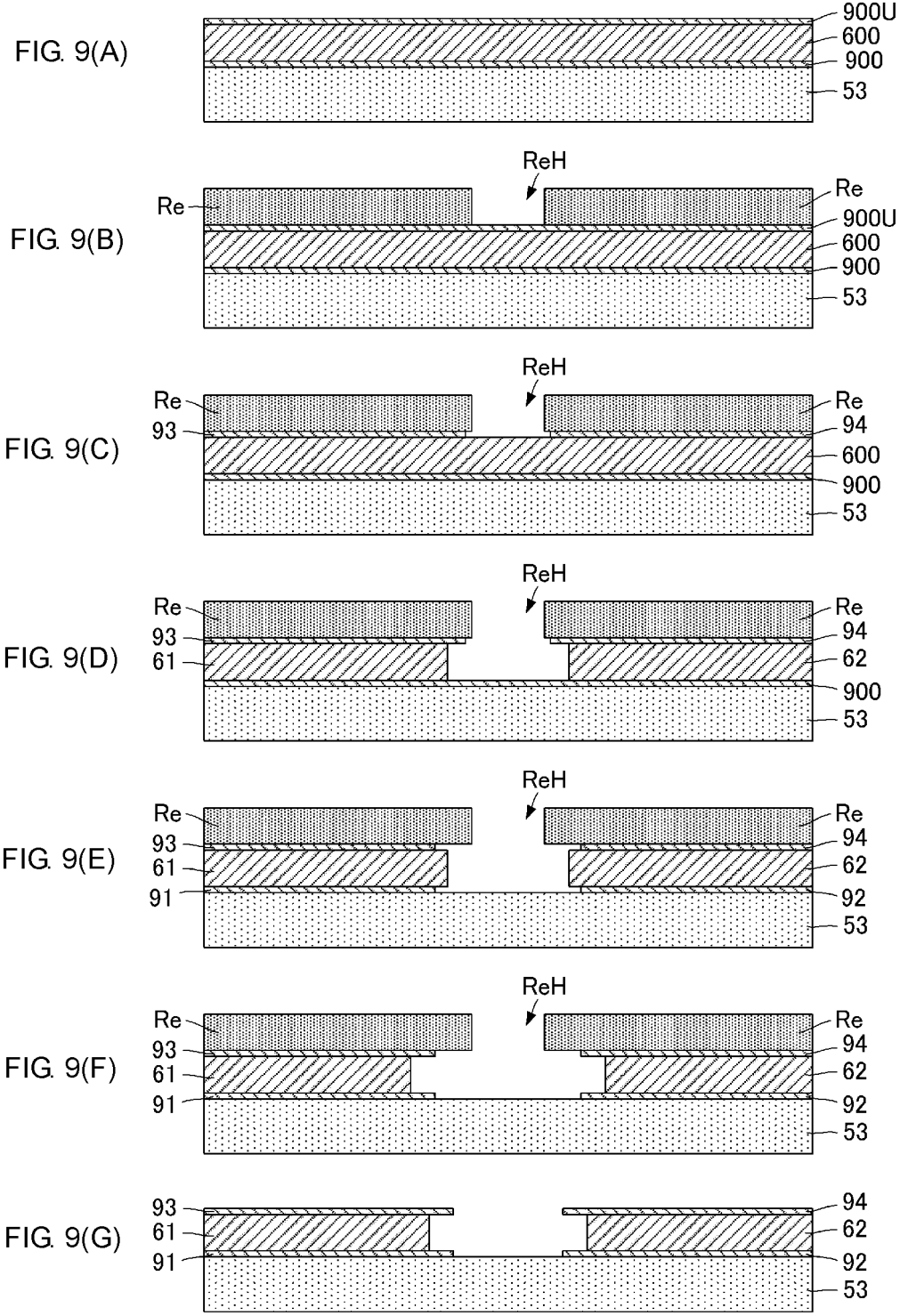
FIGS. 9(A) to 9(G) are partial sectional side views each of which schematically illustrates the shape of a portion of the rewiring layer in each step illustrated in FIG. 8.

As illustrated in FIG. 9(A), a close-contact layer 900 is formed on a surface of the resin insulating layer 53 that serves as a base of the rewiring layer (S201). The close-contact layer 900D is made of titanium or a material containing titanium as a main component and is formed so as to have a thickness of, for example, 100 nm. In addition, as illustrated in FIG. 9(A), a metallic layer 600 is formed on a surface of the close-contact layer 900 (S202). The metallic layer 600 is made of copper and is formed so as to have a thickness of, for example, 1,000 nm. Furthermore, as illustrated in FIG. 9(A), a close-contact layer 900U that is positioned on the side on which an external terminal is disposed is formed on a surface of the metallic layer 600 (S203). The close-contact layer 900U is made of titanium or a material containing titanium as a main component and is formed so as to have a thickness of, for example, 100 nm.

Next, as illustrated in FIG. 9(B), a resist film Re is formed on a surface of the close-contact layer 900U (S204). In this case, the resist film Re has a resist non-formed portion ReH formed at a position where the metallic layers 61 and 62, which will be mentioned later, are separated from each other, where the close-contact layers 91 and 92 are separated from each other, and where the close-contact layers 93 and 94 are separated from each other.

Next, selective etching is performed on the close-contact layer 900U by using a second selective etching liquid that dissolves the close-contact layer 900U and that does not dissolve the metallic layer 600 (S205). As a result, as illustrated in FIG. 9(C), the close-contact layer 93 and the close-contact layer 94 that are separated from each other are formed.

Next, selective etching is performed on the metallic layer 600 by using a first selective etching liquid that dissolves the metallic layer 600 and that does not dissolve the close-contact layer 900 (S206). As a result, as illustrated in FIG. 9(D), the metallic layer 61 and the metallic layer 62 that are separated from each other are formed.

Next, selective etching is performed on the close-contact layers 93 and 94, which are positioned on the side on which the external terminal is disposed, and on the close-contact layer 900 by using a second selective etching liquid that dissolves the close-contact layer 900 and that does not dissolve the metallic layer 600 (S207). As a result, as illustrated in FIG. 9(E), the close-contact layer 91 and the close-contact layer 92 that are separated from each other are formed. In this step, end portions of the close-contact layers 91 and 93 are positioned further inside than an end portion of the metallic layer 61 is. In other words, in this state, the end portion of the metallic layer 61 projects further than the end portions of the close-contact layers 91 and 93 do along the interface (the surface of the resin insulating layer 53). Similarly, the end portion of the metallic layer 62 projects further than the end portions of the close-contact layers 92 and 94 do along the interface (the surface of the resin insulating layer 53).

Next, additional etching is performed on the metallic layers 61 and 62 by using the first selective etching liquid that dissolves the metallic layers 61 and 62 and that does not dissolve the close-contact layers 91, 92, 93, and 94 (S208). As a result, as illustrated in FIG. 9(F), the end portions of the close-contact layers 91 and 93 project further than the end portion of the metallic layer 61 does along the interface (the surface of the resin insulating layer 53). Similarly, the end portions of the close-contact layers 92 and 94 project further than the end portion of the metallic layer 62 does along the interface (the surface of the resin insulating layer 53).

Next, as illustrated in FIG. 9(G), the resist film Re is removed (S209).

As described above, by employing the manufacturing method according to the present embodiment, a structure in which the end portions of the close-contact layers 91 and 93 project further than the end portion of the metallic layer 61 does along the interface (the surface of the resin insulating layer 53) and in which the end portions of the close-contact layers 92 and 94 project further than the end portion of the metallic layer 62 does along the interface (the surface of the resin insulating layer 53) can be realized without using different resist patterns for the metallic layers and for the close-contact layers.

Figure 10:
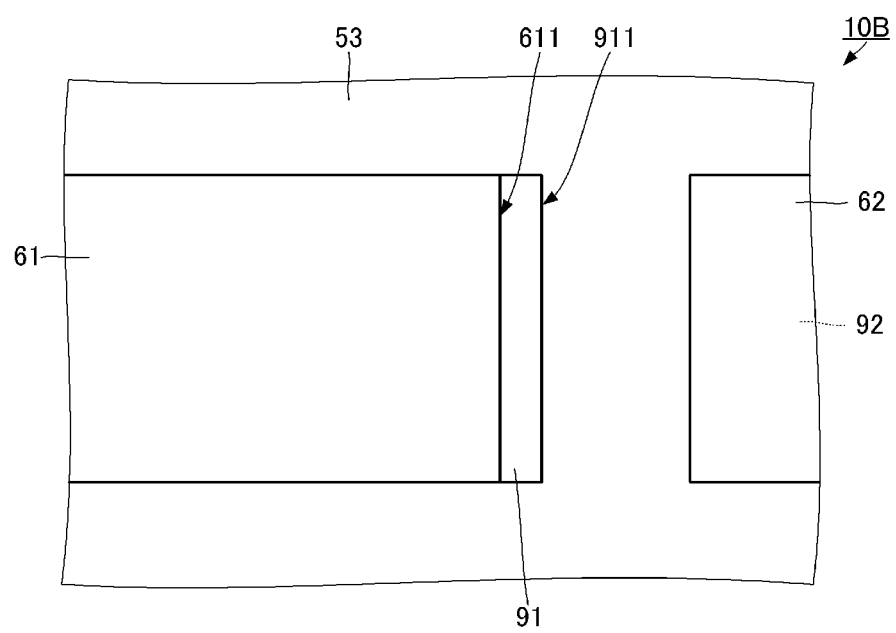
FIG. 10 is an enlarged plan view illustrating a structure of wiring electrodes of a rewiring layer of a thin-film device according to a third embodiment of the present invention.

A thin-film device according to a third embodiment of the present invention will now be described with reference to the drawings. FIG. 10 is an enlarged plan view illustrating a structure of wiring electrodes of a rewiring layer of the thin-film device according to the third embodiment of the present invention.

The difference between a thin-film device 10B according to the third embodiment and the thin-film device 10 according to the first embodiment is the structures of the close-contact layers 91 and 92. The rest of the configuration of the thin-film device 10B is similar to that of the thin-film device 10, and descriptions of similar portions will be omitted.

As illustrated in FIG. 10, only an end portion 911 of the close-contact layer 91 that faces the metallic layer 62 and the close-contact layer 92 projects further than the end portion 611 of the metallic layer 61 does.

Electrochemical migration occurs between the metallic layer 61 on the positive electrode side and the metallic layer 62 on the negative electrode side, and a dendrite extends from the metallic layer 61 on the positive electrode side to the metallic layer 62 on the negative electrode side.

Thus, also with such a configuration, occurrence of electrochemical migration can be suppressed. In addition, the area of the metallic layer 61 can be increased, and thus, the resistance of the wiring electrode formed of the metallic layer 61 and the close-contact layer 91 can be reduced.

Note that, as illustrated in FIG. 10, end portions of the metallic layer 62 and the close-contact layer 92 on the negative electrode side may be flush with each other. The end portion of the close-contact layer 92 does not need to project further than the end portion of the metallic layer 62 does, and also in this case, the above-described advantageous effects can be obtained.

In the above description, although an aspect in which a capacitor is used as the functional element of the thin-film device has been described, the above-described configuration can be applied to a rewiring layer for a functional element, such as an ESD protective element or a variable-capacitor element, that includes a positive electrode terminal and a negative electrode terminal.

REFERENCE SIGNS LIST

10, 10A, 10B thin-film device
20 base substrate
30 capacitor layer
31 first capacitor electrode
32 second capacitor electrode
33 dielectric layer
41, 42 insulator layer
51, 52 base input/output electrode
53 resin insulating layer
54 surface
61, 62 metallic layer
71 resin insulating layer
81, 82 terminal electrode
81A, 82A solder bump
91, 92, 93, 94 close-contact layer
501, 502 contact hole
530 front-surface portion
531 side-surface portion
600 metallic layer
601, 602 contact hole
611, 621 end portion
900, 900D, 900U close-contact layer
911, 921, 931, 941 end portion
Re resist film
ReH resist non-formed portion

The invention claimed is:
1. A thin-film device comprising:
a base portion; and a first resin insulating layer and a second resin insulating layer that are sequentially arranged from a side of the base portion;

a first wiring electrode at an interface between the first resin insulating layer and the second resin insulating layer, wherein the first wiring electrode includes:
   a first close-contact layer on a surface of the first resin insulating layer;
   a first metallic layer on a surface of the first close-contact layer; and
   wherein the first close-contact layer projects from an end portion of the first metallic layer by a first predetermined length along the interface, and
   wherein the first metallic layer has a first surface in contact with the first close-contact layer and a second surface opposite to the first surface, and
wherein the thin-film device further includes a second close-contact layer on the second surface, and
wherein the second close-contact layer projects from the end portion of the metallic layer by a second predetermined length along the interface.

2. The thin-film device according to claim 1, further comprising:
   a functional element between the side of the base portion and the first insulating layer, the functional element including a positive electrode terminal and a negative electrode terminal,
   wherein the first wiring electrode is connected to the positive electrode terminal.

3. The thin-film device according to claim 2, further comprising:
   a second wiring electrode connected to the negative electrode terminal, wherein the second wiring electrode includes:
   a third close-contact layer on a surface of the first resin insulating layer;
   a second metallic layer on a surface of the third close-contact layer; and
   wherein the third close-contact layer projects from an end portion of the second metallic layer by a second predetermined length along the interface.

4. The thin-film device according to claim 3,
   wherein a thickness of the first metallic layer is larger than a thickness of the first close-contact layer; and
   wherein a thickness of the second metallic layer is larger than a thickness of the third close-contact layer.

5. The thin-film device according to claim 3,
   wherein the first metallic layer and the second metallic layer are made of copper or an alloy containing copper as a main component thereof, and
   wherein the first close-contact layer and the third close-contact layer are made of titanium or a material containing titanium as a main component thereof.

6. The thin-film device according to claim 1, wherein a thickness of the first metallic layer is larger than a thickness of the first close-contact layer.

7. The thin-film device according to claim 1,
   wherein the first metallic layer is made of copper or an alloy containing copper as a main component thereof, and
   wherein the first close-contact layer is made of titanium or a material containing titanium as a main component thereof.

8. The thin-film device according to claim 1, wherein the second close-contact layer is made of the same material as the first close-contact layer.

9. The thin-film device according to claim 1, wherein the first predetermined length or the second predetermined length is not less than a thickness of the first metallic layer.

10. A thin-film device comprising:
   a base portion;
   a first resin insulating layer and a second resin insulating layer that are sequentially arranged from a side of the base portion;
   a first wiring electrode at an interface between the first resin insulating layer and the second resin insulating layer, wherein the first wiring electrode includes:
      a first close-contact layer on a surface of the first resin insulating layer;
      a first metallic layer on a surface of the first close-contact layer; and
      wherein the first close-contact layer projects from an end portion of the first metallic layer by a first predetermined length along the interface;
   a second wiring electrode connected to the negative electrode terminal, wherein the second wiring electrode includes:
      a second close-contact layer on a surface of the first resin insulating layer;
      a second metallic layer on a surface of the second close-contact layer; and
      wherein the second close-contact layer projects from an end portion of the second metallic layer by a second predetermined length along the interface;
   a functional element between the side of the base portion and the first insulating layer, the functional element including a positive electrode terminal and a negative electrode terminal,
   wherein the first wiring electrode is connected to the positive electrode terminal,
   wherein the first metallic layer has a first surface in contact with the first close-contact layer and a second surface opposite to the first surface,
   wherein the second metallic layer has a third surface in contact with the second close-contact layer and a fourth surface opposite to the third surface, and
   wherein the thin-film device further includes:
      a third close-contact layer on the second surface, wherein the third close-contact layer projects from the end portion of the first metallic layer by a third predetermined length along the interface, and
      a fourth close-contact layer on the fourth surface, wherein the fourth close-contact layer projects from the end portion of the second metallic layer by a fourth predetermined length along the interface.

11. The thin-film device according to claim 10, wherein the third close-contact layer is made of the same material as the first close-contact layer; and the fourth close-contact layer is made of the same material as the second close-contact layer.

12. The thin-film device according to claim 10, wherein the first predetermined length or the third predetermined length is not less than a thickness of the first metallic layer, and the second predetermined length or the fourth predetermined length is not less than a thickness of the second metallic layer.

* * * * *